(12) United States Patent
Oota

(10) Patent No.: US 8,406,700 B2
(45) Date of Patent: Mar. 26, 2013

(54) MOBILE STATION AND RADIO BASE STATION

(75) Inventor: Yoshiyuki Oota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 32 days.

(21) Appl. No.: 12/724,007

(22) Filed: Mar. 15, 2010

(65) Prior Publication Data

US 2010/0167773 A1 Jul. 1, 2010

Related U.S. Application Data

(63) Continuation of application No. PCT/JP2007/070203, filed on Oct. 16, 2007.

(51) Int. Cl.
 *H04B 1/00* (2006.01)
 *H04B 7/00* (2006.01)
(52) U.S. Cl. .......................... 455/69; 455/515
(58) Field of Classification Search ............ 455/515, 455/67.11, 67.13, 67.14, 68, 69, 115.1, 115.2, 455/115.3, 226.1, 226.2
See application file for complete search history.

(56) References Cited

U.S. PATENT DOCUMENTS

| | | | | |
|---|---|---|---|---|
| 7,852,954 B2* | 12/2010 | Ihm et al. | ...................... | 375/260 |
| 2006/0030272 A1* | 2/2006 | Nakamizo et al. | .............. | 455/69 |
| 2009/0041105 A1 | 2/2009 | Okazaki | | |

FOREIGN PATENT DOCUMENTS

| | | |
|---|---|---|
| EP | 1901459 | 3/2008 |
| JP | 2003152671 | 5/2003 |
| JP | 2004080306 | 3/2004 |
| JP | 2005252827 | 9/2005 |
| JP | 2007036405 | 2/2007 |
| WO | 2007013559 | 2/2007 |
| WO | 2007088580 | 8/2007 |

OTHER PUBLICATIONS

International Search Report dated Jan. 29, 2008, in corresponding International Application No. PCT/JP2007/070203.
Notification Concerning Transmittal of International Preliminary Report on Patentability in corresponding International application No. PCT/JP2007/070203 dated Apr. 29, 2010.

* cited by examiner

*Primary Examiner* — Ping Hsieh
(74) *Attorney, Agent, or Firm* — Smith, Gambrell & Russell, LLP

(57) ABSTRACT

A mobile station includes a reception quality generating unit that generates the reception quality based on a reception quality measured for data transmitted after transmission of a preamble signal. The mobile station is in a mobile communication system in which, a radio base station transmits the data after transmission of the preamble signal and, after transmission of a signal and before transmission of a subsequent preamble signal from the radio base station, the mobile station transmits to the radio base station, reception quality of the signal transmitted from the radio base station, whereby a transmission parameter for data transmitted to the mobile station after transmission of the subsequent preamble signal can be changed.

3 Claims, 18 Drawing Sheets

FIG.2

| ITEM | CINR [dB] | CQI VALUE | NOTE |
|---|---|---|---|
| 1 | -10 ~ -8 | 1 | |
| 2 | -8 ~ -6 | 2 | |
| 3 | -6 ~ -4 | 3 | |
| 4 | -4 ~ -2 | 4 | |
| 5 | -2 ~ 0 | 5 | |
| 6 | 0 ~ 2 | 6 | |
| 7 | 2 ~ 4 | 7 | |
| 8 | 4 ~ 6 | 8 | |
| 9 | 6 ~ 8 | 9 | |
| 10 | 8 ~ 10 | 10 | |
| 11 | 10 ~ 12 | 11 | |
| 12 | 12 ~ 14 | 12 | |
| 13 | 14 ~ 16 | 13 | |
| 14 | 16 ~ 18 | 14 | |
| 15 | 18 ~ 20 | 15 | |
| 16 | 20 ~ 22 | 16 | |
| 17 | 22 ~ 24 | 17 | |
| 18 | 24 ~ 26 | 18 | |
| 19 | 26 ~ 28 | 19 | |
| 20 | 28 ~ 30 | 20 | |
| 21 | 30 ~ 32 | 21 | |
| 22 | 32 ~ 34 | 22 | |
| 23 | 34 ~ 36 | 23 | |
| 24 | 36 ~ 38 | 24 | |
| 25 | 38 ~ 40 | 25 | |
| 26 | 40 ~ 42 | 26 | |
| 27 | 42 ~ 44 | 27 | |
| 28 | 44 ~ 46 | 28 | |
| 29 | 46 ~ 48 | 29 | |
| 30 | 48 ~ 50 | 30 | |

FIG.4

CQI VALUE REPORT FROM MS1

| SUBCARRIER | FIRST SYMBOL | SECOND SYMBOL | ... | LAST SYMBOL | ESTIMATION AT NEXT FRAME |
|---|---|---|---|---|---|
| 1 | 7 | 5 | | 16 | 30 |
| 2 | 6 | 3 | | 18 | 29 |
| 3 | 8 | 6 | | 20 | 28 |
| 4 | 5 | 7 | | 22 | 27 |
| ... | | | ... | | |
| 501 | 5 | 30 | | 9 | 0 |
| 502 | 2 | 29 | | 8 | 0 |
| 503 | 2 | 28 | | 6 | 0 |
| 504 | 1 | 30 | | 9 | 0 |
| ... | | | ... | | ... |
| 1021 | 30 | 2 | | 8 | 8 |
| 1022 | 28 | 3 | | 8 | 6 |
| 1023 | 29 | 4 | | 7 | 7 |
| 1024 | 29 | 3 | | 7 | 6 |

FIG.5

CQI VALUE REPORT FROM MS2

| SUBCARRIER | FIRST SYMBOL | SECOND SYMBOL | ... | LAST SYMBOL | ESTIMATION AT NEXT FRAME |
|---|---|---|---|---|---|
| 1 | 16 | 30 | | 7 | 5 |
| 2 | 18 | 29 | | 6 | 3 |
| 3 | 20 | 28 | | 8 | 6 |
| 4 | 22 | 27 | | 5 | 7 |
| ... | ... | ... | ... | ... | ... |
| 501 | 9 | 0 | | 5 | 30 |
| 502 | 8 | 0 | | 2 | 29 |
| 503 | 6 | 0 | | 2 | 28 |
| 504 | 9 | 0 | | 1 | 30 |
| ... | ... | ... | ... | ... | ... |
| 1021 | 8 | 8 | | 30 | 2 |
| 1022 | 8 | 6 | | 28 | 3 |
| 1023 | 7 | 7 | | 29 | 4 |
| 1024 | 7 | 6 | | 29 | 3 |

FIG.6

CQI VALUE REPORT FROM MS3

| SUBCARRIER | FIRST SYMBOL | SECOND SYMBOL | ... | LAST SYMBOL | ESTIMATION AT NEXT FRAME |
|---|---|---|---|---|---|
| 1 | 5 | 16 |  | 30 | 7 |
| 2 | 3 | 18 |  | 29 | 6 |
| 3 | 6 | 20 |  | 28 | 8 |
| 4 | 7 | 22 |  | 27 | 5 |
| ... | ... | ... | ... | ... | ... |
| 501 | 30 | 9 |  | 0 | 5 |
| 502 | 29 | 8 |  | 0 | 2 |
| 503 | 28 | 6 |  | 0 | 2 |
| 504 | 30 | 9 |  | 0 | 1 |
| ... | ... | ... | ... | ... | ... |
| 1021 | 2 | 8 |  | 8 | 30 |
| 1022 | 3 | 8 |  | 6 | 28 |
| 1023 | 4 | 7 |  | 7 | 29 |
| 1024 | 3 | 7 |  | 6 | 29 |

FIG.7

| ITEM | CQI VALUE | BIT NUMBER | MODULATION SCHEME | CODE RATE |
|---|---|---|---|---|
| 1 | 0 ~ 5 | 100 | QPSK | 0.5 |
| 2 | 6 ~ 10 | 150 | QPSK | 0.75 |
| 3 | 11 ~ 15 | 200 | 16QAM | 0.5 |
| 4 | 16 ~ 20 | 300 | 16QAM | 0.75 |
| 5 | 21 ~ 25 | 300 | 64QAM | 0.5 |
| 6 | 26 ~ 30 | 450 | 64QAM | 0.75 |

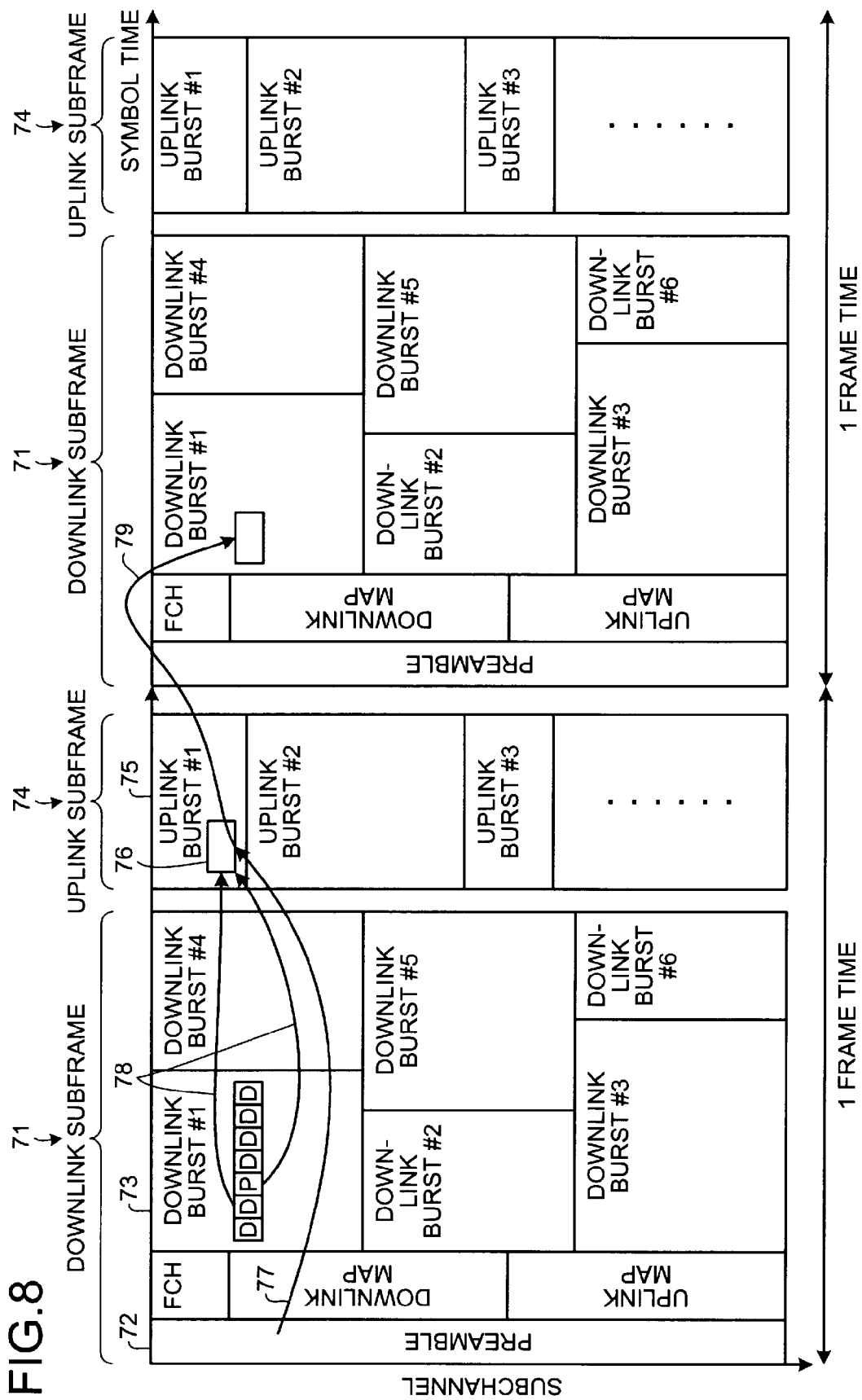

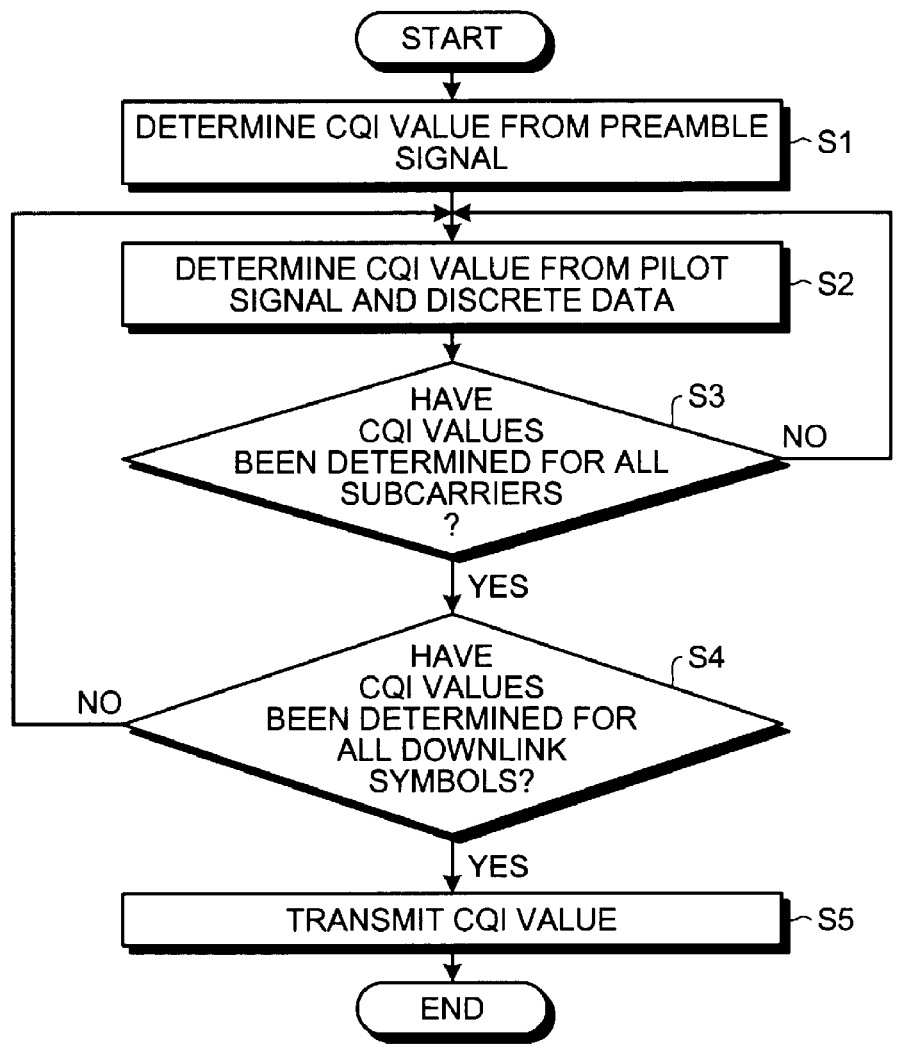
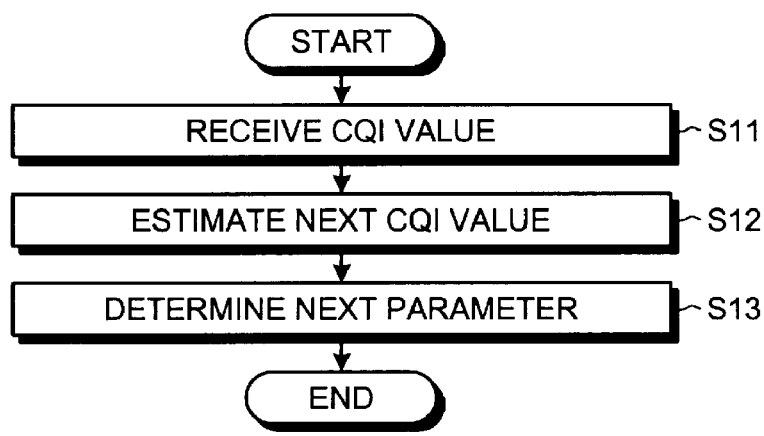

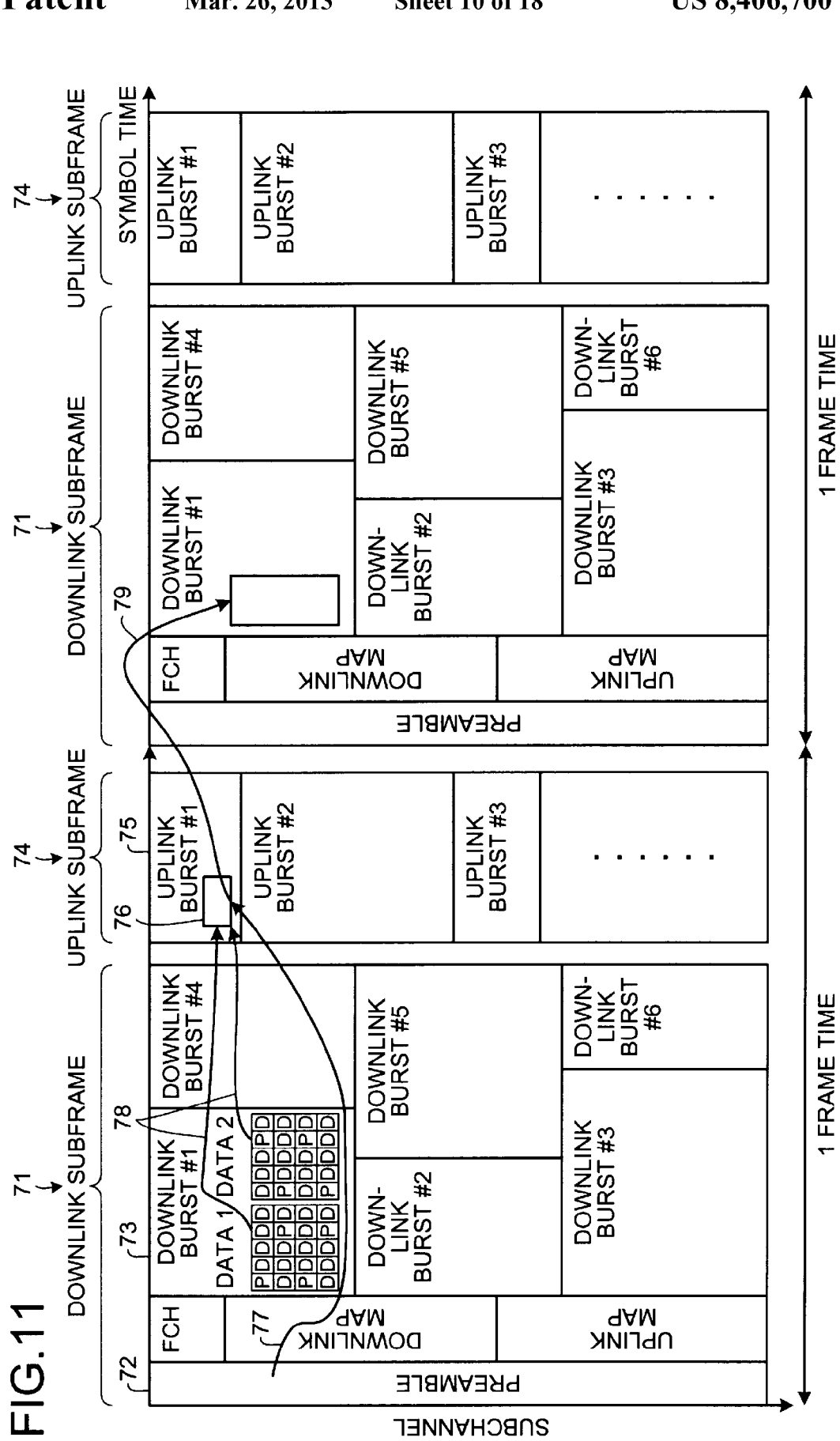

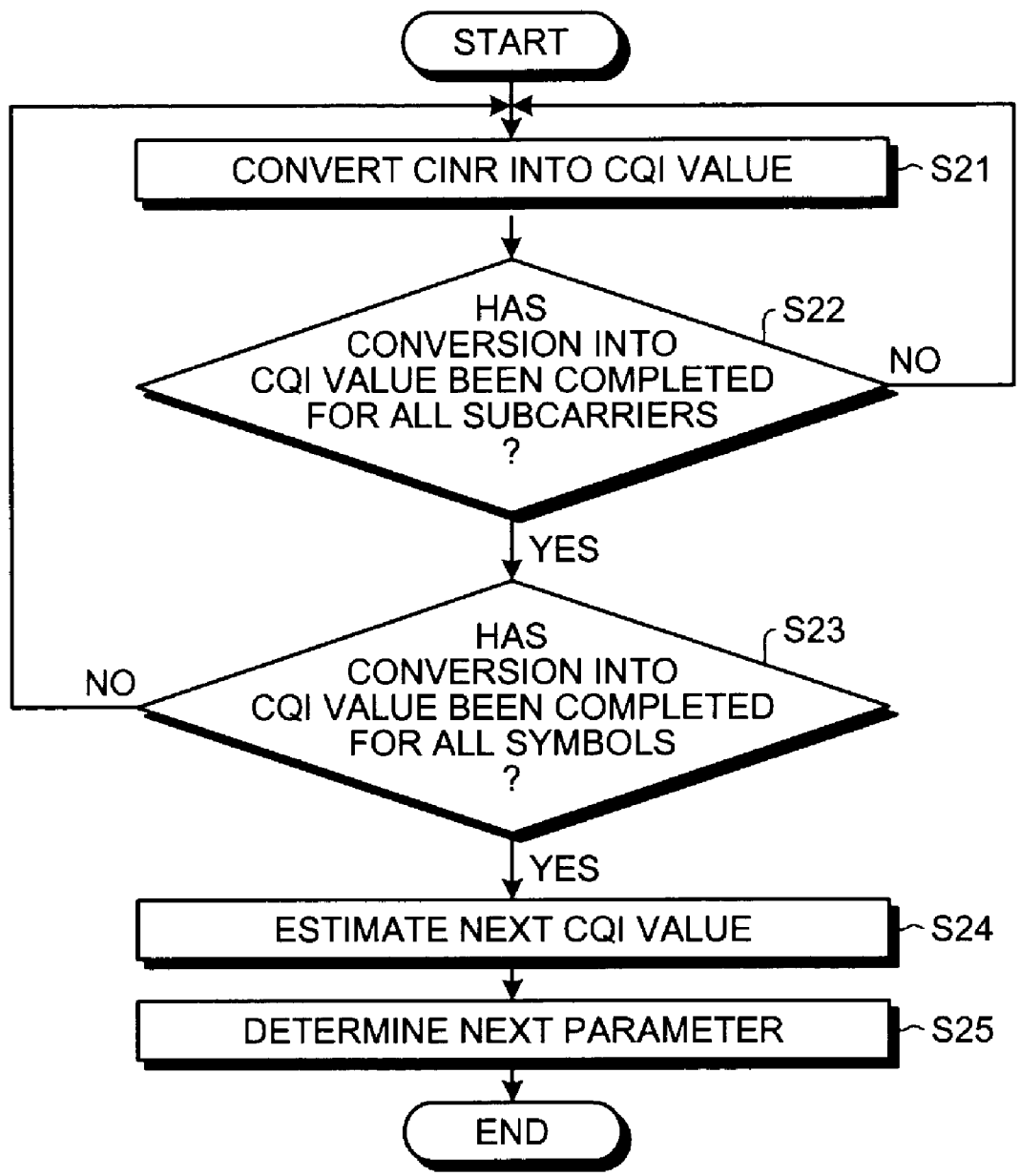

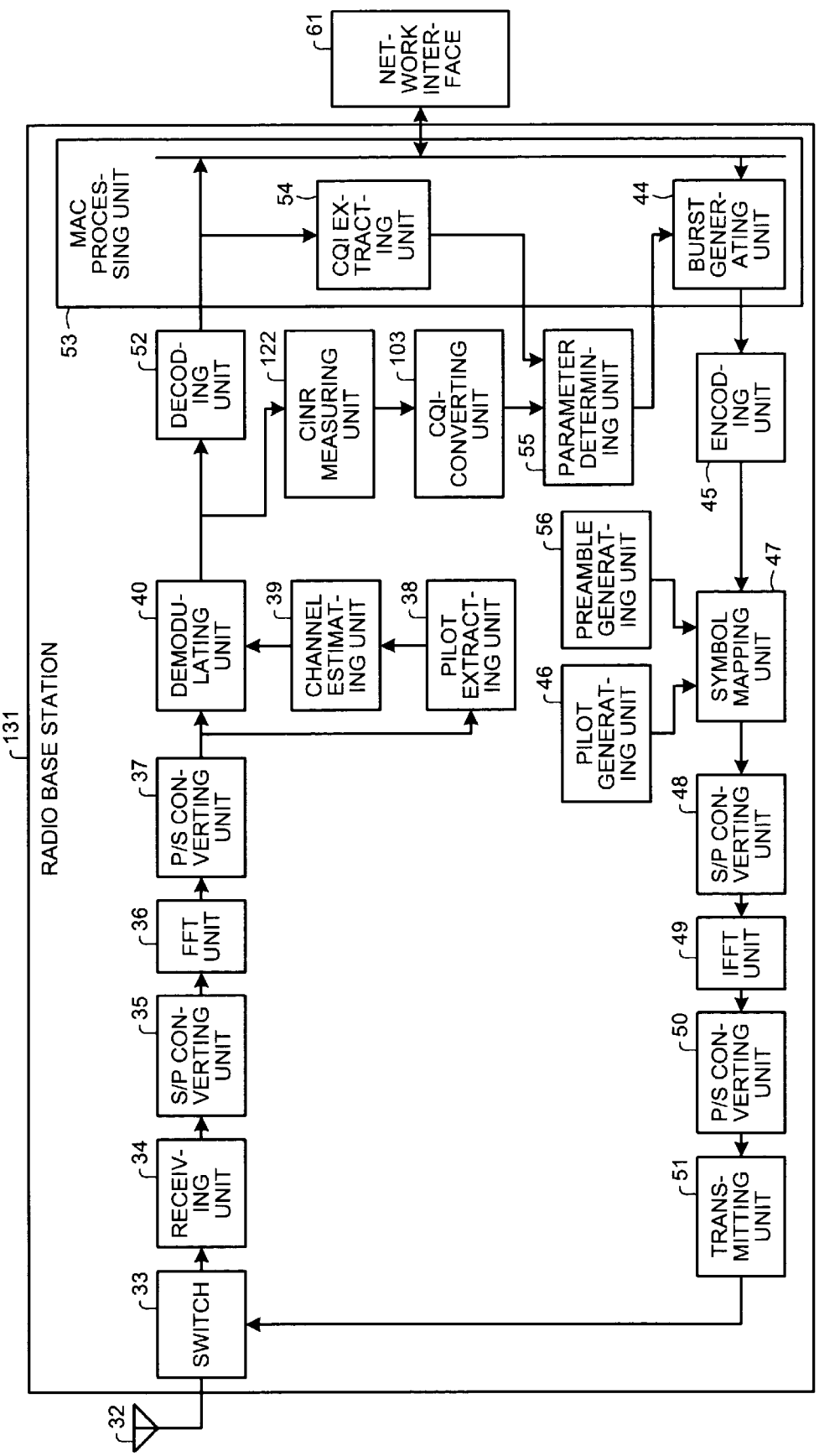

MOBILE STATION AND RADIO BASE STATION

CROSS REFERENCE TO RELATED APPLICATION

This is a continuation application of PCT/JP2007/070203 filed on Oct. 16, 2007, the contents of which are incorporated herein by reference.

FIELD

The embodiments discussed herein are related to a mobile station and a radio base station in a mobile communication system in which a transmission parameter when the radio base station transmits data to the mobile station can be changed, based on the reception quality of a radio signal.

BACKGROUND

Conventionally, among terminals used in a multicarrier adaptive modulation communication system in which a terminal transmitting data selects a modulation scheme for each carrier and transmits data based on information for adaptive modulation sent from a terminal receiving data, a terminal that estimates propagation path information from the preamble of a received signal is commonly known (see, e.g., Japanese Laid-Open Patent Publication No. 2005-252827 (claim 8)). An orthogonal frequency division multiplexing system is commonly known in which a receiving terminal groups subcarriers into blocks each consisting of several subcarriers according to the reception power of subcarriers and reports control information on each block to a transmitting terminal so that the transmitting terminal controls the transmission power of subcarriers in the block based on the control information (see e.g., Japanese Laid-Open Patent Publication No. 2003-152671 (paragraph 0026 and claim 1)).

According to the disclosure in Japanese Laid-Open Patent Publication No. 2005-252827, however, the modulation scheme at data transmission is selected based on propagation path information estimated from the preamble of a received signal. This leads to a problem in that discrete data throughput may deteriorate when the phasing environment at transmission of a preamble signal is different from the phasing environment at transmission of data (hereinafter "discrete data") to be transmitted after transmission of the preamble signal. According to the disclosure in Japanese Laid-Open Patent Publication No. 2003-152671, control information is transmitted during a period in which the characteristics of frequency selective phasing in a propagation path hardly change, bringing about a problem in that when the characteristics of frequency selective phasing change, sufficient control over transmission power cannot be carried out, thereby inviting the deterioration of discrete data throughput.

SUMMARY

According to an aspect of an embodiment, a mobile station includes a reception quality generating unit that generates the reception quality based on a reception quality measured for data transmitted after transmission of a preamble signal. The mobile station is in a mobile communication system in which, a radio base station transmits the data after transmission of the preamble signal and, after transmission of a signal and before transmission of a subsequent preamble signal from the radio base station, the mobile station transmits to the radio base station, reception quality of the signal transmitted from the radio base station, whereby a transmission parameter for data transmitted to the mobile station after transmission of the subsequent preamble signal can be changed.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 depicts an example of a CINR-CQI correlation table.

FIGS. 4 to 6 are examples of CQI value reports from mobile stations MS1, MS2, and MS3, respectively.

FIG. 7 depicts an example of a CQI-transmission parameter correlation table.

FIG. 8 depicts an example of mapping on a frame of the first embodiment.

FIG. 9 depicts a CQI reporting process by the mobile station of the first embodiment.

FIG. 10 depicts a transmission parameter determining process by the radio base station of the first embodiment.

FIG. 11 depicts an example of mapping on a frame in a first modification of the first embodiment.

FIG. 18 depicts a transmission parameter determining process by the radio base station of the third embodiment.

FIG. 19 depicts a configuration of a radio base station according to a fourth embodiment.

DESCRIPTION OF EMBODIMENTS

Figure 1:
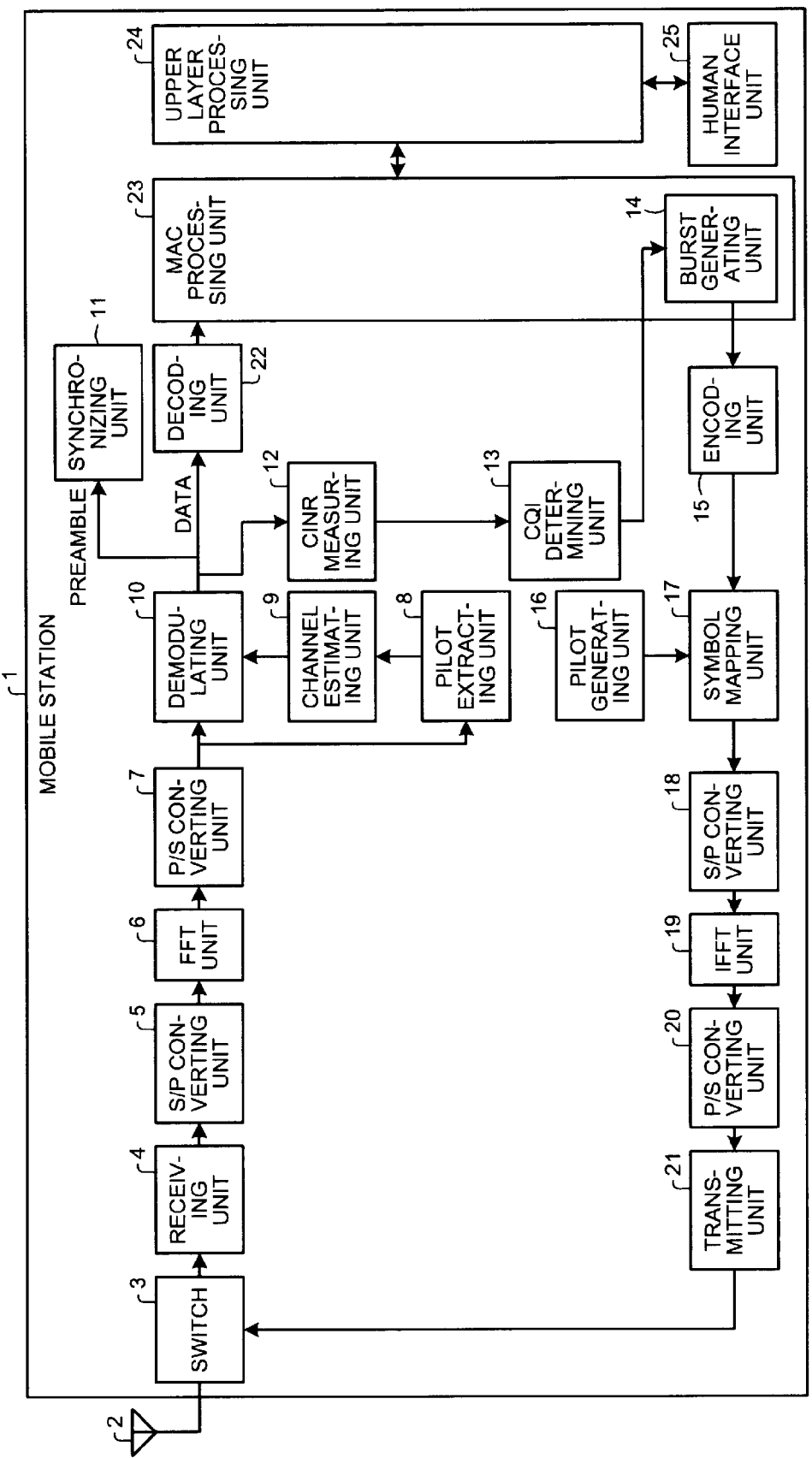
FIG. 1 depicts a configuration of a mobile station according to a first embodiment.

Preferred embodiments of the present invention will be explained with reference to the accompanying drawings. A mobile communication system that carries out time division duplexing (TDD) by the orthogonal frequency division multiple access (OFDMA) scheme will be described as an example of the embodiments. The embodiments do not limit the present invention. In the following description, like reference numerals are used for like components, and repetitive explanations are omitted.

FIG. 1 depicts a configuration of a mobile station according to a first embodiment. As depicted in FIG. 1, the mobile station 1 includes a first antenna 2, a first switch 3, a first receiving unit 4, a first serial/parallel (S/P) converting unit 5, a first fast Fourier transform (FFT) unit 6, a first parallel/serial (P/S) converting unit 7, a first pilot extracting unit 8, a first channel estimating unit 9, a first demodulating unit 10, a synchronizing unit 11, a carrier to interference and noise ratio (CINR) measuring unit 12, a channel quality indicator (CQI) determining unit 13, a first burst generating unit 14, a first encoding unit 15, a first pilot generating unit 16, a first symbol mapping unit 17, a second serial/parallel (S/P) converting unit 18, a first inverse fast Fourier transform (IFFT) unit 19, a second parallel/serial (P/S) converting unit 20, and a first transmitting unit 21.

The mobile station 1 receives a radio signal via the first antenna 2 through a switching operation by the first switch 3. The first receiving unit 4 demodulates the received high-frequency radio signal into a base band signal. The first serial/parallel converting unit 5 converts the signal output from the first receiving unit 4 into a parallel signal adapted to be subjected to Fourier transform by the first FFT unit 6. The first FFT unit 6 carries out Fourier transform on the signal output from the first serial/parallel converting unit 5 to extract data. The first parallel/serial converting unit 7 converts the signal output from the first FFT unit 6 into a serial signal adapted to be subjected to the following processes. The first serial/parallel converting unit 5 and the first parallel/serial converting unit 7 may be omitted.

The first pilot extracting unit 8 extracts a pilot signal from the signal output from the first parallel/serial converting unit 7. The first channel estimating unit 9 estimates a propagation environment based on the signal output from the first pilot extracting unit 8. The first demodulating unit 10 corrects and demodulates data output from the first parallel/serial converting unit 7, using the propagation environment estimated by the first channel estimating unit 9, to acquire the original discrete data and preamble signal. The synchronizing unit 11 recognizes the head of a radio frame to synchronize the radio frame, based on the preamble signal demodulated by the first demodulating unit 10.

The CINR measuring unit 12 measures CINR for each subcarrier of the preamble signal obtained by the first demodulating unit 10. The CINR measuring unit 12 also measures CINR for each subcarrier of the discrete data obtained by the first demodulating unit 10, based on the pilot signal obtained by the first demodulating unit 10. At this time, the CINR measuring unit 12 can measure not only the CINR for each subcarrier of discrete data addressed to the mobile station 1 but also the CINR for each subcarrier of discrete data not addressed to the mobile station 1. In other words, the CINR measuring unit 12 can measure a CINR for each subcarrier in a downlink subframe.

The CQI determining unit 13 determines a CQI value based on a CINR measured by the CINR measuring unit 12. The CQI determining unit 13 has, for example, a CINR-CQI correlation table, and may convert a CINR into a CQI value by referring to the CINR-CQI correlation table (see FIG. 2). The CINR measuring unit 12 and the CQI determining unit 13 function as a reception quality generating unit.

The first burst generating unit 14 maps a CQI value determined by the CQI determining unit 13 and uplink data to be transmitted to a radio station, onto an uplink burst. For example, because an OFDMA communication system is provided with a CQI reporting channel (channel quality indication channel (CQICH)), a CQI value is mapped as a CQICH. Transmission from the mobile station to the radio base station is defined as uplink transmission, while transmission in the reverse direction is defined as downlink transmission. The first encoding unit 15 encodes the signal output from the first burst generating unit 14.

The first pilot generating unit 16 generates an uplink pilot signal. The first symbol mapping unit 17 maps a bit signal resulting from encoding by the first encoding unit 15 and a pilot signal generated by the first pilot generating unit 16, onto symbols on a complex plane according to the applicable modulation scheme. The second serial/parallel converting unit 18 converts the signal output from the first symbol mapping unit 17 into a parallel signal adapted to be subjected to inverse fast Fourier transform by the first IFFT unit 19.

The first IFFT unit 19 converts the signal output from the second serial/parallel converting unit 18 by inverse fast Fourier transform into an OFDM signal or OFDMA signal. The second parallel/serial converting unit 20 converts the signal output from the first IFFT unit 19 into a serial signal. The second serial/parallel converting unit 18 and the second parallel/serial converting unit 20 may be omitted. The first transmitting unit 21 modulates the signal output from the second parallel/serial converting unit 20 into a high-frequency radio signal. The mobile station 1 transmits the radio signal output from the first transmitting unit 21 via the first antenna 2 through a switching operation by the first switch 3.

The mobile station 1 further includes a first decoding unit 22, a first media access control (MAC) processing unit 23, an upper layer processing unit 24, and a human interface 25. The first decoding unit 22 decodes data demodulated by the first demodulating unit 10. The first MAC processing unit 23 converts the data decoded by the first decoding unit 22 into a MAC protocol data unit (MAC-PDU), MAC service data unit (MAC-SDU), internet protocol (IP) packet, etc. The first burst generating unit 14 is incorporated in this first MAC processing unit 23. The upper layer processing unit 24 processes data belonging to a layer higher in hierarchy than the MAC layer. The human interface unit 25 processes data of images, sound, etc., according to information from the upper layer processing unit 24.

FIG. 2 depicts an example of a CINR-CQI correlation table. As depicted in a CINR-CQI correlation table 26 of FIG. 2, for example, a CINR of −10 dB or more to less than −8 dB results in a CQI value of 1, and a CINR of 48 dB or more to 50 dB or less results in a CQI value of 30. The overall CINR range, the number of subdivided CINR ranges, the width of each subdivided CINR range, and a CQI value corresponding to each subdivided CINR range are not limited to the example depicted in FIG. 2.

Figure 3:
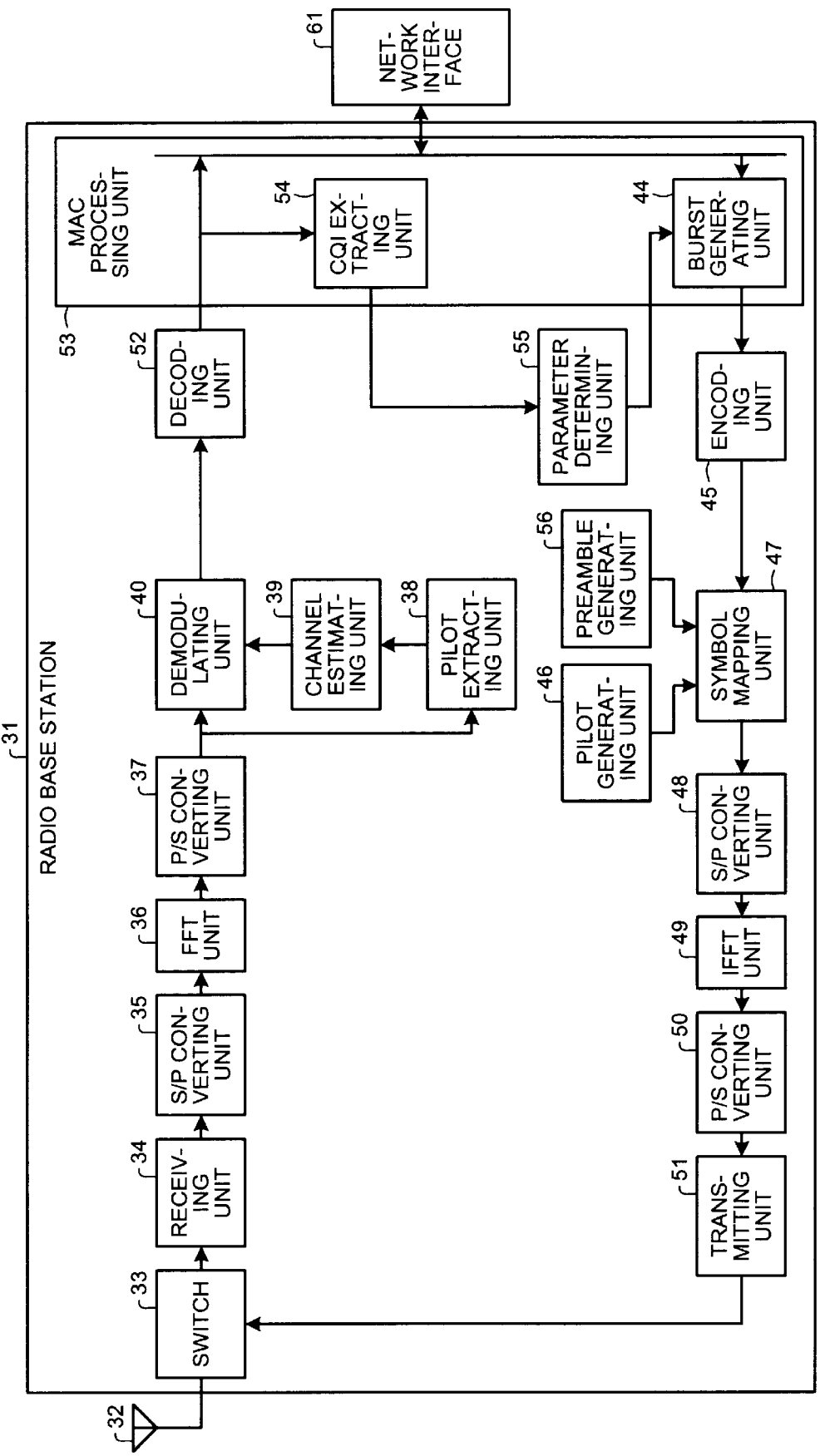
FIG. 3 depicts a configuration of a radio base station according to the first embodiment.

FIG. 3 depicts a configuration of a radio base station according to the first embodiment. As depicted in FIG. 3, the radio base station 31 includes a second antenna 32, a second switch 33, a second receiving unit 34, a third serial/parallel converting unit 35, a second FFT unit 36, a third parallel/serial converting unit 37, a second pilot extracting unit 38, a second channel estimating unit 39, a second demodulating unit 40, a second decoding unit 52, a CQI extracting unit 54, a parameter determining unit 55, a second burst generating unit 44, a second encoding unit 45, a second pilot generating unit 46, a preamble generating unit 56, a second symbol mapping unit 47, a fourth serial/parallel converting unit 48, a second IFFT unit 49, a fourth parallel/serial converting unit 50, a second transmitting unit 51, and a second MAC processing unit 53.

The second switch 33, the second receiving unit 34, the third serial/parallel converting unit 35, the second FFT unit 36, the third parallel/serial converting unit 37, the second pilot extracting unit 38, the second channel estimating unit 39, the second demodulating unit 40, the second decoding unit 52, and the second MAC processing unit 53 are basically the same as the first switch 3, the first receiving unit 4, the first serial/parallel converting unit 5, the first FFT unit 6, the first parallel/serial converting unit 7, the first pilot extracting unit 8, the first channel estimating unit 9, the first demodulating unit 10, the first decoding unit 22, and the first MAC processing unit 23 of the above mobile station 1, respectively. The second demodulating unit 40, however, does not output a preamble signal, and the second MAC processing unit 53 is connected to a network, such as the Internet, via a network interface 61.

The CQI extracting unit 54 extracts a CQI value from a signal output from the second decoding unit 52. The parameter determining unit 55 estimates a CQI value of the next frame for each mobile station by, for example, linear approximation by a least-squares method, the method of which is not particularly specified. The parameter determining unit 55 determines a subcarrier to use, based on the CQI value estimated for each mobile station (see FIGS. 4 to 6), and also determines parameters, such as a modulation scheme, an encoding scheme, and an encoding rate, used upon transmission of downlink data. The parameter determining unit 55 has, for example, a CQI-transmission parameter correlation table, and may select a parameter corresponding to an estimated CQI value by referring to the CQI-transmission parameter correlation table (see FIG. 7). A method of subcarrier assignment and parameter determination by the parameter determining unit 55 will be described hereinafter.

The second burst generating unit 44 maps downlink data on a downlink burst taking into consideration a parameter determined by the parameter determining unit 55, propagation environment, and the priority of downlink data to be transmitted to the mobile station, etc. The second burst generating unit 44 and the CQI extracting unit 54 are incorporated in the second MAC processing unit 53. The second encoding unit 45 encodes the signal output from the second burst generating unit 44. The second pilot generating unit 46 generates a downlink pilot signal. The preamble generating unit 56 generates a preamble signal. The second symbol mapping unit 47 maps a bit signal resulting from encoding by the second encoding unit 45, a pilot signal generated by the second pilot generating unit 46, and a preamble signal generated by the preamble generating unit 56, onto symbols on a complex plane according to the applicable modulation scheme.

The fourth serial/parallel converting unit 48, the second IFFT unit 49, the fourth parallel/serial converting unit 50, and the second transmitting unit 51 are basically the same as the second serial/parallel converting unit 18, the first IFFT unit 19, the second parallel/serial converting unit 20, and the first transmitting unit 21 of the mobile station 1, respectively.

FIGS. 4 to 6 are examples of CQI value reports from mobile stations MS1, MS2, and MS3 that are made at the same time. For example, if reported CQI values for the first symbol to the last symbol from the mobile station MS1 are CQI values depicted in FIG. 4, the parameter determining unit 55 estimates a CQI value, for example, for the first symbol of the next frame of the mobile station MS1, based on the reported CQI values. As a result, estimated CQI values for subcarriers 1 to 4 are found to be around 30, thus concluded to be relatively fine.

In the same manner, as depicted in FIG. 5, estimated CQI values for subcarriers 501 to 504 are concluded to be fine in the case of the mobile station MS2, and, as depicted in FIG. 6, estimated CQI values for subcarriers 1021 to 1024 are concluded to be fine in the case of the mobile station MS3. Given such a result, the parameter determining unit 55 assigns the subcarriers 1 to 4 to the mobile station MS1, assigns the subcarriers 501 to 504 to the mobile station MS2, and assigns the subcarriers 1021 to 1024 to the mobile station MS3 in the next frame.

FIG. 7 depicts an example of a CQI-transmission parameter correlation table. Before generating the CQI-transmission parameter correlation table 57, for example, a transmission method set based on a CQI and a reception bit error rate (BER) for the set transmission method are verified through simulation and measurement, and then the CQI-transmission parameter correlation table 57 is generated based on the result of verification. According to the CQI-transmission parameter correlation table 57 of FIG. 7, for example, when the CQI value ranges from 0 to 5, QPSK is selected as the modulation scheme and a code rate of 0.5 results. When the CQI value ranges from 26 to 30, for example, 64QAM is selected as the modulation scheme and a code rate of 0.75 results.

If estimated CQI values for the next frame of each of the mobile stations MS1, MS2, and MS3 are the values depicted in each of FIGS. 4 to 6, parameters for each of the mobile stations MS1, MS2, and MS3 are determined to be the modulation scheme 64QAM and the code rate 0.75. The overall CQI range, the number of subdivided CQI ranges, the width of each subdivided CQI range, and parameters corresponding to each subdivided CQI range are not limited to the example of FIG. 7. While the encoding schemes and transmission power are fixed in the example of FIG. 7, the encoding schemes and transmission power may be variable.

FIG. 8 depicts an example of mapping on a frame of the first embodiment. As depicted in FIG. 8, on a downlink subframe 71, a preamble signal 72 is mapped at the head and a downlink burst 73 is mapped behind the preamble signal 72 temporally, the downlink burst 73 being discrete data transmitted from the radio station to each mobile station. In FIG. 8, "D" and "P" in a downlink burst #1 represent a discrete data signal and a pilot signal, respectively (similarly in FIGS. 11 and 17).

On an uplink subframe 74, an uplink burst 75 is mapped, which is discrete data transmitted from each mobile station to the radio base station. In the downlink subframe 71 and the uplink subframe 74, a burst #1, a burst #2, . . . are used by different mobile stations, respectively. A CQI value reported from each mobile station to the radio base station is mapped onto, for example, a CQICH 76 of each uplink burst. The radio base station determines a transmission parameter for each downlink burst in the next frame, based on CQI values reported by each mobile station respectively.

While FIG. 8 depicts an example where a mobile station using the burst #1 reports CQI values for a preamble signal and any one of symbols of any one of subcarriers in the downlink burst #1, to the radio base station, the CQI value for the preamble signal may not be reported. Preferably, each mobile station reports CQI values for all subcarriers to the radio base station by reporting CQI values for a preamble signal and a downlink burst. While FIG. 8 also depicts an example where the radio base station determines a transmission parameter for the downlink burst #1 in the next frame based on a CQI value reported by the mobile station using the burst #1, the radio base station actually also determines a transmission parameter for another downlink burst to another mobile station.

In FIG. 8, an arrow 77 represents the reflection of a CINR measured for the preamble signal on a CQI value to be reported to the radio base station. Likewise, an arrow 78 represents the reflection of a CINR measured for discrete data on the CQI value to be reported to the radio base station. An arrow 79 represents the reflection of the CQI value reported to the radio base station on a transmission parameter for the next frame. These arrows 77, 78, and 79 are indicative of the same in FIG. 11.

FIG. 9 depicts a CQI reporting process by the mobile station of the first embodiment. The mobile station 1 measures a CINR for a preamble signal, and converts the CINR into a CQI value to determine the CQI value for the preamble signal (step S1). The mobile station 1 then measures a CINR for discrete data using a pilot signal, and converts the CINR into a CQI value to determine the CQI value for the discrete data (step S2). The mobile station 1 then determines whether CQI values have been determined for all subcarriers (step S3). Of course, CQI values are determined for a range in which CQI value determination is possible, and CQI values do not necessarily have to be determined for all subcarriers (the same applies to the following description).

If CQI values have been determined for all subcarriers (step S3: YES), whether CQI values have been determined for all downlink symbols is determined (step S4). If CQI values have not been determined for all subcarriers (step S3: NO) or have not been determined for all downlink symbols (step S4: NO), the process flow returns to step S2. If CQI values have been determined for all downlink symbols (step S4: YES), the CQI values are mapped on an uplink subframe and are transmitted to the radio base station (step S5). This series of processes is repeated for each frame. A CQI value for each subcarrier or for each symbol may be transmitted, and a CQI value given by averaging and weight-synthesizing CQI values for a pilot symbol and data symbols (including a data symbol addressed to the mobile station and other data symbols addressed to other mobile stations) may be transmitted. In the latter case, a CQI value for the preamble may be included, and only the CQI value for the pilot symbol, the CQI value for the data symbol addressed to the mobile station 1, the CQI value for a data symbol addressed to another mobile station, or the CQI value for data addressed to the mobile station 1 and to another mobile station may be transmitted. A CQI value may be given by subjecting a CINR to averaging and weight-synthesizing before conversion and then converting the resulting CINR into a CQI value.

FIG. 10 depicts a transmission parameter determining process by the radio base station of the first embodiment. The radio base station 31 receives a CQI value from the mobile station (step S11). The radio base station 31 estimates a CQI value for a downlink subframe in the next frame based on the received CQI value (step S12), and then determines a transmission parameter for the downlink subframe in the next frame based on the estimated CQI value (step S13). This series of processes is repeated for each frame. When receiving multiple CQI values for the same subcarrier, the radio base station may select the last CQI value to use in determining a transmission parameter, or may determine a transmission parameter using a CQI value given by averaging and weight-synthesizing CQI values for the same subcarrier. In either case, the quality of a data symbol to be transmitted after transmission of a preamble is used for determining the transmission parameter.

FIG. 11 depicts an example of mapping on a frame in a first modification of the first embodiment. As depicted in FIG. 11, in the first modification, for each subchannel consisting of multiple subcarriers, a CQI value is acquired from CINR and the acquired CQI values are reported from the mobile station to the radio base station. A subchannel may be formed by removing some subcarriers at equal intervals from the original series of subcarriers or grouping subcarriers adjacent to each other. Other processes are the same as those described in the first embodiment.

Figure 12:
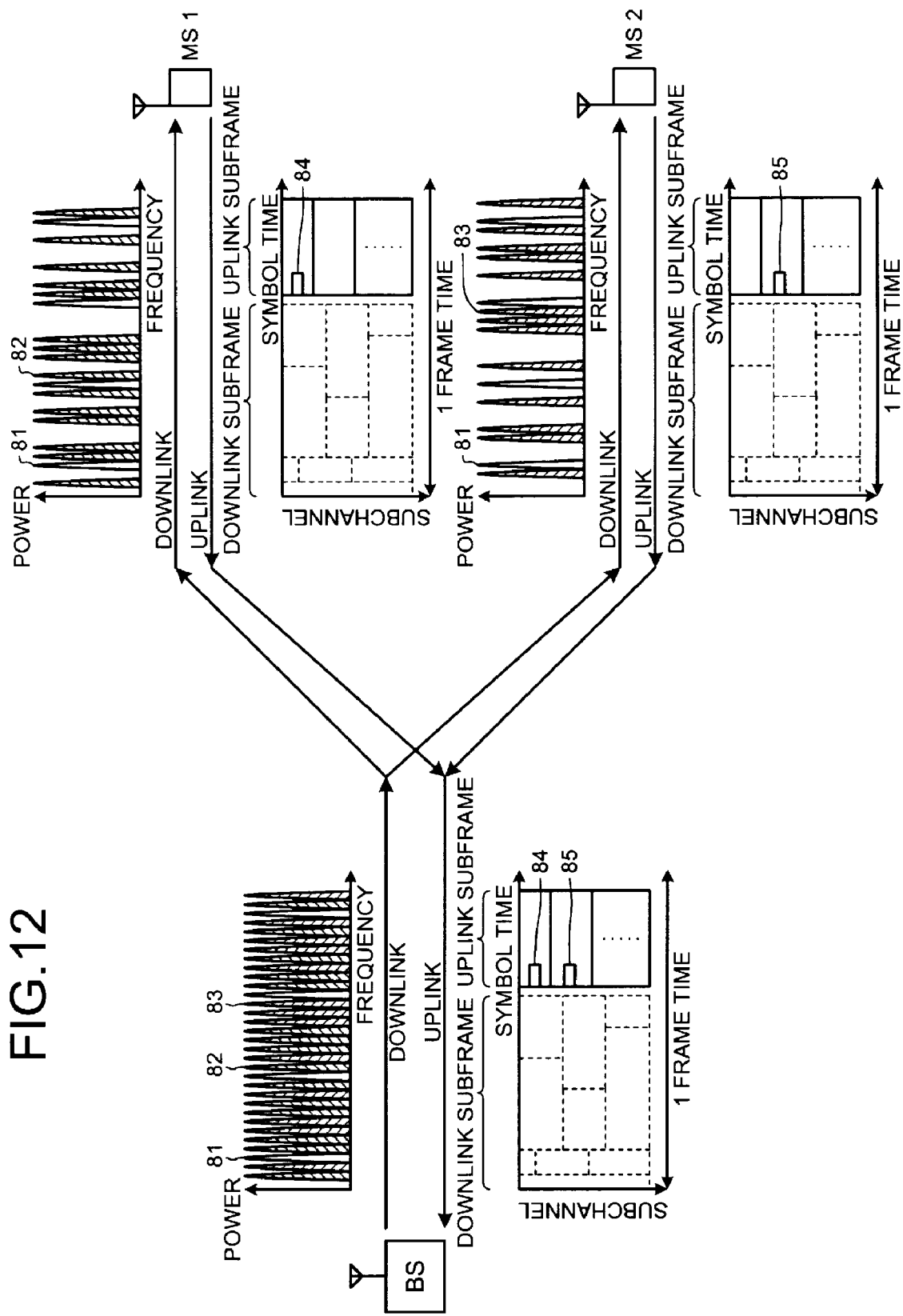
FIG. 12 depicts an example of a downlink discrete data signal and uplink mapping in a second modification of the first embodiment.

FIG. 12 depicts an example of a downlink discrete data signal and uplink mapping in a second modification of the first embodiment. FIG. 12 depicts a case of two mobile stations. As depicted in FIG. 12, according to the second modification, each mobile station determines not CQI values for all subcarriers but only the CQI value for a subcarrier of data sent from the radio base station to the mobile station (data addressed to the mobile station) while determining a CQI value for the other subcarrier by CQI value interpolation, and reports the CQI values to the radio base station.

The radio base station BS transmits a radio wave including, mixed together, a subcarrier 81 of a pilot signal, a subcarrier 82 of discrete data addressed to the mobile station MS1, and a subcarrier 83 of discrete data addressed to the mobile station MS2. The mobile stations MS1 and MS2 receive this radio wave including the mixed subcarriers. In FIG. 12, the subcarrier 81 of the pilot signal, the subcarrier 82 of discrete data addressed to the mobile station MS1, and the subcarrier 83 of discrete data addressed to the mobile station MS2 are depicted as a waveform without hatching, a waveform with left-downward hatching, and a waveform with right-downward hatching, respectively.

The mobile station MS1 uses the subcarrier 81 of the pilot signal to measure a CINR for the subcarrier 82 of discrete data addressed to the mobile station MS1, and converts the CINR to a CQI value for each subcarrier. The mobile station MS1 determines a CQI value for the subcarrier 83 of discrete data addressed to the mobile station MS2 by interpolation. The mobile station MS1 then puts the CQI value determined based on the subcarrier 82 of discrete data addressed to the mobile station MS1 and the CQI value determined by interpolation in a CQICH 84 of the uplink burst #1 to transmit the CQI values to the radio base station BS.

The mobile station MS2 uses the subcarrier 81 of the pilot signal to measure a CINR for the subcarrier 83 of discrete data addressed to the mobile station MS2, and converts the CINR to a CQI value for each subcarrier. The mobile station MS2 determines a CQI value for the subcarrier 82 of discrete data addressed to the mobile station MS1 by interpolation. The mobile station MS2 then puts the CQI value determined based on the subcarrier 83 of discrete data addressed to the mobile station MS2 and the CQI value determined by interpolation in a CQICH 85 of the uplink burst #2 to transmit the CQI values to the radio base station BS. Other processes are the same as processes described in the first embodiment.

A third modification is a combination of the first and the second modifications. According to the third modification, each mobile station determines not CQI values for all subchannels but only the CQI value for a subchannel of data sent from the radio base station to the mobile station (data addressed to the mobile station) while determining a CQI value for the other subchannels by CQI value interpolation, and reports the CQI values to the radio station. Other processes are the same as processes described in the first embodiment.

According to the first embodiment, because discrete data and a pilot signal in a downlink subframe are closer in time to the next frame than a preamble signal, consideration of the reception quality of the discrete data in the downlink subframe enables more precise estimation of the propagation environment of discrete data in the next frame. This enables more precise determination of a transmission parameter for the next frame, and thus effects improved discrete data throughput.

Figure 13:
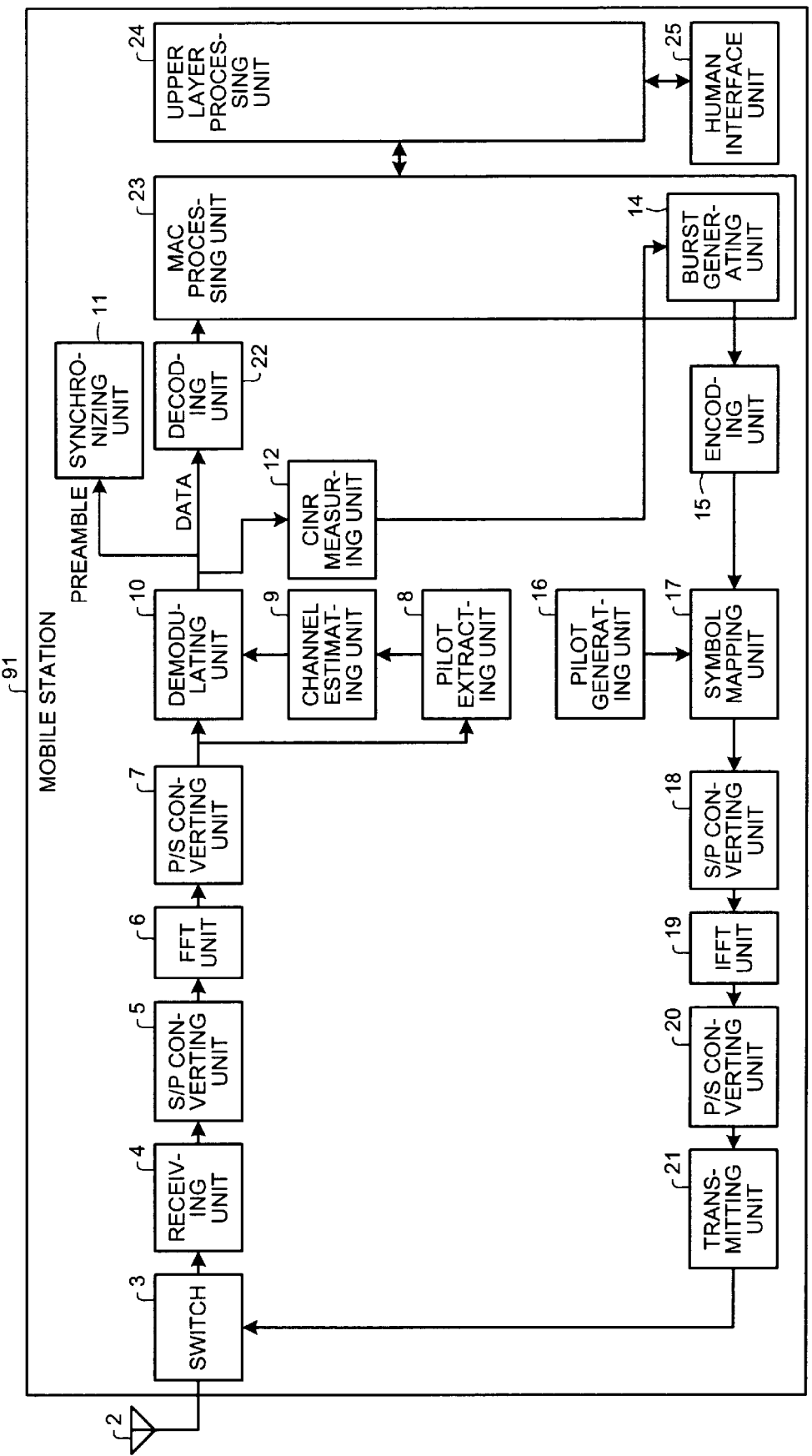
FIG. 13 depicts a configuration of a mobile station according to a second embodiment.
Figure 14:
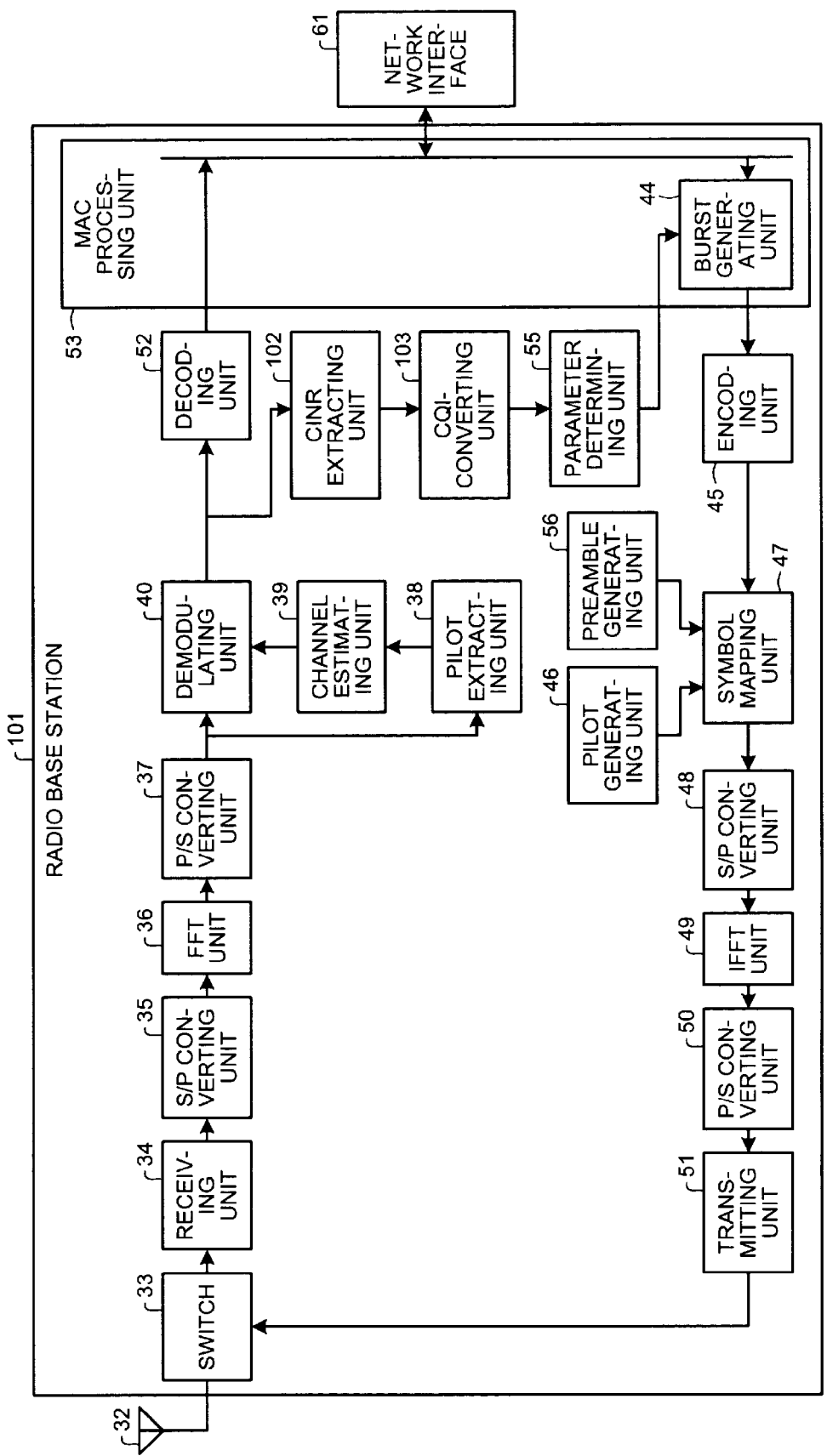
FIG. 14 depicts a configuration of a radio base station according to the second embodiment.

FIGS. 13 and 14 depict a configuration of a mobile station and a configuration of a radio base station according to a second embodiment, respectively. As depicted in FIGS. 13 and 14, according to the second embodiment, a CINR is reported from the mobile station 91 to the radio base station 101 for each subcarrier, and the CINR is converted into a CQI value at the radio base station 101. The mobile station 91, therefore, does not need to have the CQI determining unit. The radio base station 101, on the other hand, has a CINR extracting unit 102 and a CQI-converting unit 103. A CINR is measured for at least one among a pilot symbol and a data symbol (addressed to the mobile station 91 or to another mobile station) that is transmitted during a period between reception of a preamble and reception of the next preamble. A CINR on which the result of the measurement is reflected is transmitted during an uplink transmission period before reception of the next preamble. Various methods of reflecting CINR measurement can be adopted. The measurement result may be transmitted directly, an averaged CINR may be transmitted for the same subcarrier, or a CINR obtained by heavily weighting a CINR later in time sequence in weight-synthesizing CINRs may be transmitted. In such a case, CINRs including a CINR for the preamble may be averaged or weight-synthesized, and averaging and weight-synthesizing may be carried out at the radio base station. CINRs may be converted first into CQI values, which are then weight-synthesized, or CINRs may be weight-synthesized first into a synthesized CINR, which is then converted into a CQI value.

The CINR extracting unit 102 extracts a CINR from the signal output from the second demodulating unit 40. The CQI-converting unit 103 converts the CINR extracted by the CINR extracting unit 102 into a CQI value based on, for example, the CINR-CQI correlation table of FIG. 2. The CQI-converting unit 103, therefore, has the CINR-CQI correlation table of FIG. 2. The parameter determining unit 55 estimates a CQI value for the next frame of each mobile station, based on the CQI value converted by the CQI-converting unit 103, and determines a transmission parameter to be applied to a downlink burst in the next frame.

In the same manner as in the first embodiment, the mobile station may measure a CINR for each subchannel, or may measure a CINR for data addressed to the mobile station while determining a CINR for data addressed to another mobile station by interpolation. Other processes are the same as processes in the first embodiment. According to the second embodiment, the radio base station carries out the process of converting a CINR into a CQI value, so that processes carried out by the mobile station are reduced.

Figure 15:
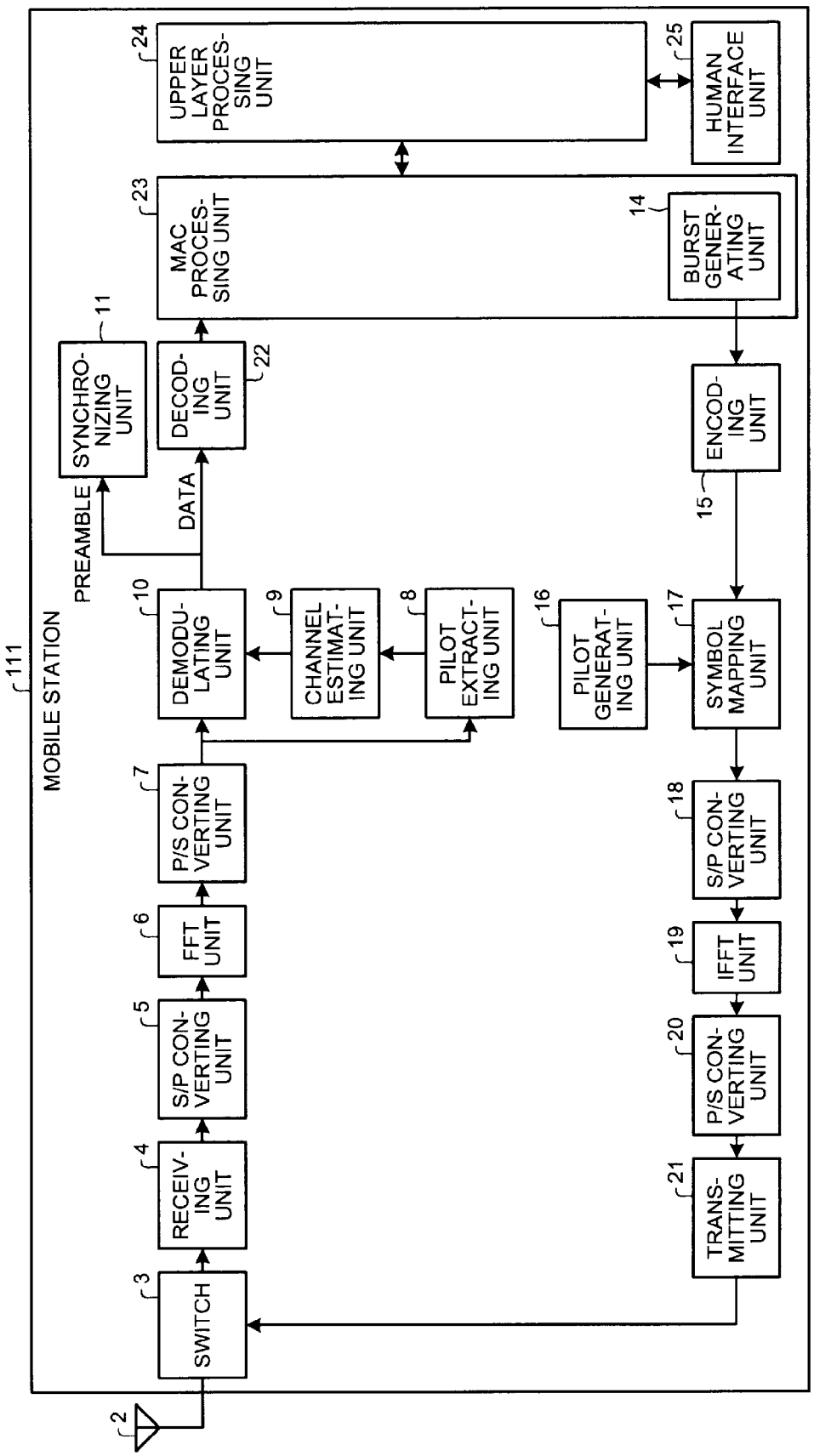
FIG. 15 depicts a configuration of a mobile station according to a third embodiment.
Figure 16:
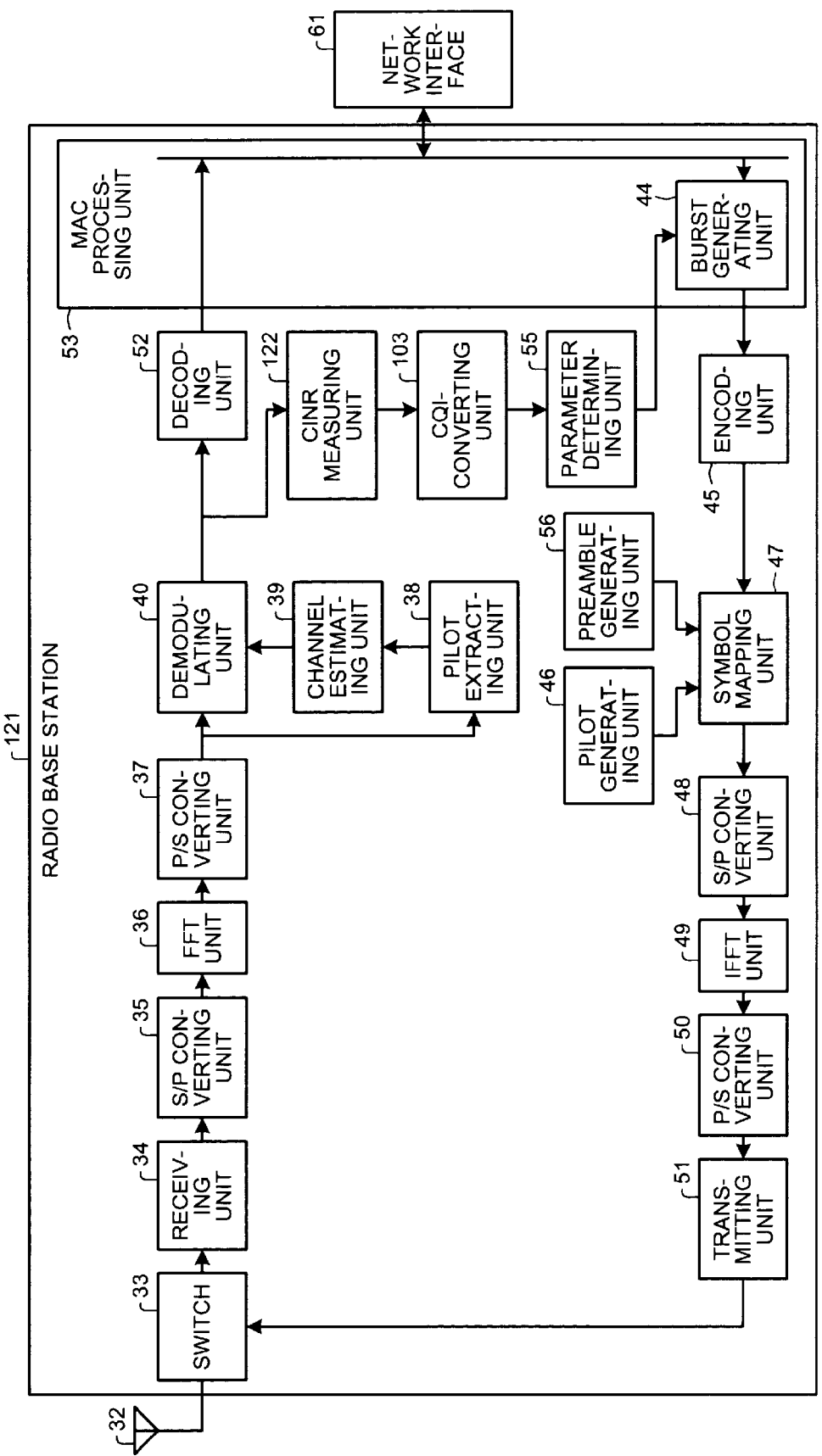
FIG. 16 depicts a configuration of a radio base station according to a third embodiment.

FIGS. 15 and 16 depict a configuration of a mobile station and a configuration of a radio base station according to a third embodiment, respectively. As depicted in FIGS. 15 and 16, according to the third embodiment, the radio base station 121 determines a CINR for a signal received from the mobile station 111 for each subcarrier and converts the CINR into a CQI value using the reversibility of time division duplexing (TDD). The mobile station 111, therefore, does not need to have the CINR measuring unit and the CQI determining unit. The radio base station 121, on the other hand, has a CINR measuring unit 122 and the CQI-converting unit 103. The reversibility of TDD means that because the frequencies of subcarriers used in uplink and downlink transmission can be set identical in TDD, the reception characteristics of an uplink signal at the radio base station can be estimated to be identical with the reception characteristics of a downlink signal at the mobile station.

The CINR measuring unit 122 measures a CINR for each subcarrier of discrete data obtained by the second demodulating unit 40, based on a pilot signal obtained by the second demodulating unit 40. The CQI-converting unit 103 converts a CINR measured by the CINR measuring unit 122 into a CQI value in the same manner as in the second embodiment. The parameter determining unit 55 estimates a CQI value for the next frame of each mobile station, based on a CQI value converted by the CQI-converting unit 103, and determines a transmission parameter to be applied to a downlink burst in the next frame of each mobile station. The CINR measuring unit 122 and the CQI-converting unit 103 function as a reception quality measuring unit, and the parameter determining unit 55 functions as a control unit that controls a transmission parameter.

Figure 17:
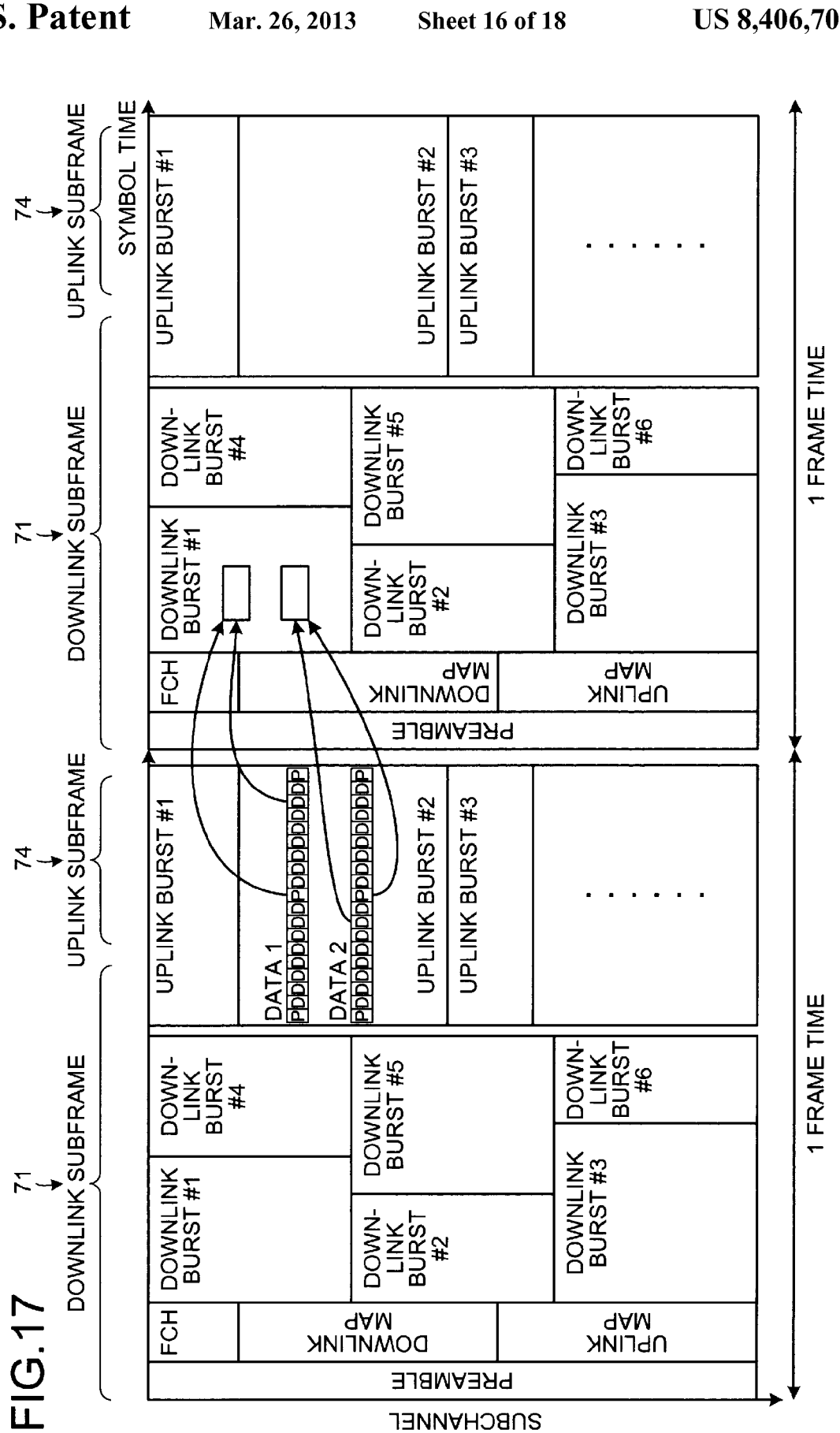
FIG. 17 depicts an example of mapping on a frame of the third embodiment.

FIG. 17 depicts an example of mapping on a frame of the third embodiment. In FIG. 17, arrows represent the reflection of CQI values determined from a pilot signal (denoted by P) and a discrete data signal (denoted by D) of an uplink burst on a transmission parameter for the next frame. The third embodiment includes a case where all uplink subcarriers are used by one or more mobile stations 111 and a case where some uplink subcarriers are not used. The CINR measuring unit 122 may determine a CINR for an unused uplink subcarrier by interpolation based on a CINR for the adjacent uplink subcarrier. As depicted in FIG. 17, the reception quality of the uplink subframe 74 is the reception quality in a time period closer to the next downlink subframe than the time period to which the reception quality of the downlink subframe 71 belongs. This allows estimation of a more proper reception quality at the mobile station, thus enables execution of adaptive modulation control.

FIG. 18 depicts a transmission parameter determining process by the radio base station of the third embodiment. The radio base station 121 measures a CINR for discrete data in an uplink subframe, using a pilot signal in the uplink subframe, and converts the CINR into a CQI value (step S21). The radio base station 121 then determines whether conversion into CQI values has been completed for all subcarriers (all of subcarriers assigned to uplink transmission by the mobile station in uplink mapping) (step S22). If conversion has been completed (step S22: YES), the radio base station 121 then determines whether conversion into CQI values has been completed for all uplink symbols (step S23). Obviously, convertible subcarriers and symbols are converted into CQI values, and all subcarriers do not necessarily have to be converted into CQI values.

If conversion into CQI values has not been completed for all subcarriers (step S22: NO) or has not been completed for all uplink symbols (step S23: NO), the process flow returns to step S21. If conversion into CQI values has been completed for all uplink symbols (step S23: YES), a CQI value for a downlink subframe in the next frame is estimated (step S24). Based on the estimated CQI value, then, a transmission parameter for the downlink subframe in the next frame is determined (step S25). This series of processes is repeated for each frame.

As in the same manner in the first embodiment, the radio base station may measure a CINR for each subchannel. Other processes are the same as processes described in the first embodiment. According to the third embodiment, since discrete data and a pilot signal in an uplink subframe are closer in time to the next frame than a preamble signal or a downlink subframe signal, further improvement in discrete data throughput is facilitated. The radio base station carries out CINR measurement and conversion into a CQI value. This further reduces processes carried out by the mobile station.

FIG. 19 depicts a configuration of a radio base station according to a fourth embodiment. A configuration of a mobile station of the fourth embodiment is the same as the configuration of the mobile station of the first embodiment. As depicted in FIG. 19, the fourth embodiment is a combination of the first embodiment and the third embodiment. The radio base station 131, therefore, includes the CQI extracting unit 54 as in the first embodiment, and includes the CNR measuring unit 122 and the CQI-converting unit 103 as in the third embodiment. The parameter determining unit 55 estimates a CQI value for the next frame of each mobile station, based on a CQI value obtained by the CQI extracting unit 54 and a CQI value obtained by the CQI-converting unit 103, and determines a transmission parameter to be applied to a downlink burst in the next frame of each mobile station. When both CQI values are used, the CQI values may be averaged or weight-synthesized as in the above embodiments. It is desirable that a CQI value from the CQI-converting unit 103 be given weight heavier than weight given to a CQI value from the CQI extracting unit 54 before weight-synthesizing the CQI values. By doing so, the latest CQI value can be reflected.

In the same manner as in the first embodiment, the mobile station may measure a CINR for each subchannel, or may measure a CINR for data addressed to the mobile station while determining a CINR addressed to another mobile station by interpolation. The radio base station may measure a CINR for each subchannel. In the same manner as in the second embodiment, the mobile station may report a CINR to the radio base station so that the radio base station converts the CINR into a CQI value. Other processes are the same as processes in the first embodiment. According to the fourth embodiment, the reception quality of both uplink burst and downlink burst is considered. As a result, the propagation environment of discrete data in the next frame is estimated more precisely to be able to precisely determine a transmission parameter for the next frame.

The present invention is further applicable to a mobile communication system that carries out communication by the orthogonal frequency division multiplexing scheme.

According to the mobile station and the ratio base station, reception quality is measured for discrete data transmitted after transmission of a preamble signal, and a transmission parameter for the next frame is controlled based on the measured reception quality.

Because discrete data and a pilot signal are temporally closer to discrete data in the next frame than a preamble signal, the propagation environment of the discrete data in the next frame can be estimated more precisely, thereby effecting improved discrete data throughput.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A mobile station in a mobile communication system in which, a radio base station transmits data after transmission of a preamble signal and, after transmission of a signal and before transmission of a subsequent preamble signal from the radio base station, the mobile station transmits to the radio base station, reception quality of the signal transmitted from the radio base station, whereby a transmission parameter for data transmitted to the mobile station after transmission of the subsequent preamble signal can be changed, the mobile station comprising:

a reception quality generating unit that generates the reception quality based on both (a) a reception quality that is measured, based on a pilot signal transmitted after the preamble signal, for the data transmitted after the preamble signal, and (b) a reception quality that is measured for the preamble signal, wherein the reception qualities are weighted and synthesized in a manner where a reception quality later in time sequence is given a heavier weight, the data is data transmitted to the mobile station, and the reception quality generating unit interpolates a reception quality of data transmitted to another mobile station, based on a reception quality of data transmitted to the mobile station.

2. The mobile station according to claim 1, wherein the data is data transmitted to all mobile stations that communicate with the radio base station.

3. A method for a mobile station in a mobile communication system in which, a radio base station transmits data after transmission of a preamble signal and, after transmission of a signal and before transmission of a subsequent preamble signal from the radio base station, the mobile station transmits to the radio base station, reception quality of the signal transmitted from the radio base station, whereby a transmission parameter for data transmitted to the mobile station after transmission of the subsequent preamble signal can be changed, the method comprising:

generating the reception quality based on a reception quality measured for the data transmitted after transmission of the preamble signal, wherein the generating of the reception quality uses both (a) a reception quality measured for the preamble signal and (b) the reception quality that is measured, based on a pilot signal transmitted after transmission of the preamble signal, for the data transmitted after transmission of the preamble signal, the reception qualities are weighted and synthesized in a manner where a reception quality later in time sequence is given a heavier weight, the data is data transmitted to the mobile station, and in the generating of the reception quality, a reception quality of data transmitted to another mobile station is interpolated based on a reception quality of data transmitted to the mobile station.

\* \* \* \* \*